United States Patent
Jang et al.

(10) Patent No.: US 11,648,898 B2
(45) Date of Patent: May 16, 2023

(54) MOBILE ROBOT

(71) Applicant: LG ELECTRONICS INC., Seoul (KR)

(72) Inventors: Jaewon Jang, Seoul (KR); Youngbin Kim, Seoul (KR); Yeongjae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 330 days.

(21) Appl. No.: 16/943,230

(22) Filed: Jul. 30, 2020

(65) Prior Publication Data

US 2021/0031371 A1    Feb. 4, 2021

(30) Foreign Application Priority Data

Jul. 31, 2019 (KR) .......................... 10-2019-0093476

(51) Int. Cl.
*A47L 9/00* (2006.01)
*B60R 19/42* (2006.01)
*B60R 19/28* (2006.01)

(52) U.S. Cl.
CPC ............ *B60R 19/42* (2013.01); *A47L 9/009* (2013.01); *B60R 19/28* (2013.01); *A47L 2201/04* (2013.01)

(58) Field of Classification Search
CPC ....... B60R 19/28; B60R 19/42; A47L 13/502; A47L 13/48; A47L 11/40; A47L 2201/00; A47L 2201/04; A47L 9/009; B25J 19/0075
USPC ............... 293/102, 137, 127; 15/246.2, 319
See application file for complete search history.

(56) References Cited

U.S. PATENT DOCUMENTS

2019/0038107 A1* 2/2019 Jang .................... A47L 11/4044
2020/0245837 A1* 8/2020 Furuta .................. A47L 9/2826
2021/0093146 A1* 4/2021 Pastore ............... A47L 11/4061

FOREIGN PATENT DOCUMENTS

| CN | 111035331 B | * | 7/2021 | ............. A47L 11/30 |
| EP | 2154031 A1 | | 2/2010 | |
| EP | 2155032 B1 | | 12/2015 | |
| EP | 3679847 A1 | * | 7/2020 | ........... A47L 9/2805 |
| KR | 10-2013-0031608 | | 3/2013 | |
| KR | 10-2016-0104429 | | 9/2016 | |
| KR | 10-1712867 | | 3/2017 | |
| KR | 10-2018-0008252 | | 1/2018 | |
| KR | 20180008252 A | * | 1/2018 | ........... A47L 11/405 |

(Continued)

OTHER PUBLICATIONS

European Search Report in corresponding EP application 20188620. 7-1016 dated Nov. 16, 2020 (8 pages).

(Continued)

*Primary Examiner* — Jason S Morrow
*Assistant Examiner* — Wenwei Zhuo
(74) *Attorney, Agent, or Firm* — Birch, Stewart, Kolasch & Birch, LLP

(57) ABSTRACT

The present disclosure relates to a mobile robot, and more particularly to a mobile robot, including: a bumper which surrounds at least a portion of an outer circumference of the body; position restoring modules having an elastic member and disposed to be symmetrical to each other; a bumper guide module, having a guide hole and a protruding guider which moves inside the guide hole; and impact sensing modules configured to sense impact and disposed to be symmetrical to each other.

17 Claims, 13 Drawing Sheets

(56) References Cited

FOREIGN PATENT DOCUMENTS

| KR | 10-2019-0053156 | 5/2019 | |
|----|----|----|----|
| TW | I634403 B | 9/2018 | |
| TW | 201838578 A | 11/2018 | |
| WO | WO 2008/141131 A2 | 11/2000 | |
| WO | WO-2018051008 A1 * | 3/2018 | ............... A47L 9/28 |
| WO | WO-2021137522 A1 * | 7/2021 | |

OTHER PUBLICATIONS

KR Office Actior for Korean application KR10-2019-0093476 dated Dec. 3, 2020 (7 pages).
PCT International Search Report for PCT/KR2020/010072 dated Dec. 15, 2020 (5 pages).
Office Action issued in Taiwanese Application No. 109126080, dated Jul. 7, 2021 (6 pages).

* cited by examiner

MOBILE ROBOT

CROSS-REFERENCE TO RELATED APPLICATION

This application claims the benefit of priority of Korean Patent Application No. 10-2019-0093476, filed on Jul. 31, 2019 in the Korean Intellectual Property Office, the disclosure of which is incorporated herein by reference.

TECHNICAL FIELD

The following description relates to a mobile robot, and more particularly to a mobile robot having a bumper which surrounds a body, and modules for sensing impact on the bumper and restoring the position of the bumper.

BACKGROUND

Robots have been developed for industrial applications and used as part of factory automation systems. Recently, robot applications are further extended to the field of medical robots, robots for aerospace applications and the like, and even robots for home use are being developed. These robots include robots capable of autonomously moving.

A typical example of mobile robots for home use is a robot cleaner, which is a device for cleaning a certain area by sucking dust or foreign materials while traveling in the area.

The robot cleaner is mainly composed of a cleaning robot and a charging stand. The cleaning robot includes a rechargeable battery, and may move freely and autonomously using power from the battery. The cleaning robot performs cleaning by sucking foreign materials from the floor, and if necessary, the cleaning robot returns to the charging stand to recharge the battery.

Korean Laid-open Patent Publication No. 10-2013-005513 relates to a bumper assembly of a mobile robot capable of accurately detecting not only a front impact but also a side impact when the mobile robot collides with an obstacle. However, the bumper assembly has drawbacks in that the bumper assembly of the mobile robot includes a guide member for guiding forward/rearward movement, restricts the movement of the bumper to a two-dimensional movement, and includes no device for guiding the bumper to a certain position, thereby failing to allow various movements of the bumper.

Korean Laid-open Patent Publication No. 10-2006-0118903 relates to a bumper device of a robot cleaner which includes: a bumper installed to surround an outer circumference of a main body of the robot cleaner to absorb shock; a bumper housing which forms an exterior of the bumper and is made of a material for restraining expansion; an air tube which is inserted into the bumper housing so as to be expandable along an internal passage of the bumper housing; and a sensor for sensing expansion of the air tube. Accordingly, even if an impact is applied on any position including the front surface of the main body of the robot cleaner, the bumper device may absorb shock and sense collision, and may prevent waste of space and cost by reducing volume and weight. However, the bumper device has a problem in that the bumper device also restricts the movement of the bumper to a two-dimensional movement, and fails to provide a solution to a device for guiding the bumper to a certain position.

SUMMARY

It is an object of the present disclosure to provide a mobile robot including a bumper guide module which allows free movement of the bumper within a predetermined range when an external force is applied on front and side surfaces.

It is another object of the present disclosure to provide a mobile robot which has the same restoring force for different impulses of a side impact and a front impact.

It is yet another object of the present disclosure to provide a mobile robot which includes an impact sensing module for sensing a front impact or a side impact by using a small number of detection sensors.

The objects of the present disclosure are not limited to the aforementioned objects and other objects not described herein will be clearly understood by those skilled in the art from the following description.

In accordance with one aspect of the present disclosure, the above objects are accomplished by providing a mobile robot, including: a body which forms an exterior of the mobile robot; a bumper which is spaced apart from the body and surrounds at least a portion of an outer circumference of the body; a position restoring module, with one side being connected to the body and the other side being connected to the bumper, and having an elastic member; a bumper guide module, having a guide hole which is formed at one side of the bumper, and a protruding guider which moves inside the guide hole; and an impact sensing module disposed at one side of the body, and having a bar which is adjacent to the bumper and moves along with the bumper when impact is applied, and a detection sensor configured to detect movement of the bar.

The guide hole may include: an origin point, at which the protruding guider is located when no impact is applied; a first part which extends leftward from the origin point; a second part which extends rightward from the origin point; and a third part which connects a left end of the first part and a right end of the second part.

An angle formed between the first part and the second part may be an obtuse angle. The origin point may be located behind the left end of the first part or the right end of the second part.

The guide hole may have a fan shape.

The mobile robot may further include a separation prevention cap which is connected to a top of the protruding guider.

The mobile robot may further include one or more protrusions, which protrude upward from the bumper, and one or more protrusions which protrude upward from the body.

The position restoring module may further include a first protruding member, which protrudes upward from one side of the body, and a second protruding member which protrudes from one side of the bumper and is disposed behind the first protruding member; and the elastic member may connect the first protruding member and the second protruding member.

The impact sensing module may include: a sensing module case disposed at one side of the body; a hinge disposed inside the sensing module case and having a rotation axis which is perpendicular to the floor; a first bar, one side of which is adjacent to an inner surface of the bumper and the other side of which is connected to the hinge; and a second bar, on one side of which a detection sensor for detecting movement is disposed, and the other side of which is connected to the hinge.

Details of other embodiments are included in the detailed description and the accompanying drawings.

According to the present disclosure, the mobile robot has one or more of the following effects.

Firstly, as the origin point of the guide hole is located behind the first part or the second part, the bumper may freely move within a predetermined range when an external force is applied, and may return to the origin point.

Secondly, the position restoring module is disposed diagonally, such that the same restoring force may be provided for different impulses of a side impact and a front impact.

Thirdly, by using two fan-shaped detection sensors, the front impact or the side impact may be detected, as well as a small external force.

DETAILED DESCRIPTION

Figure 1:
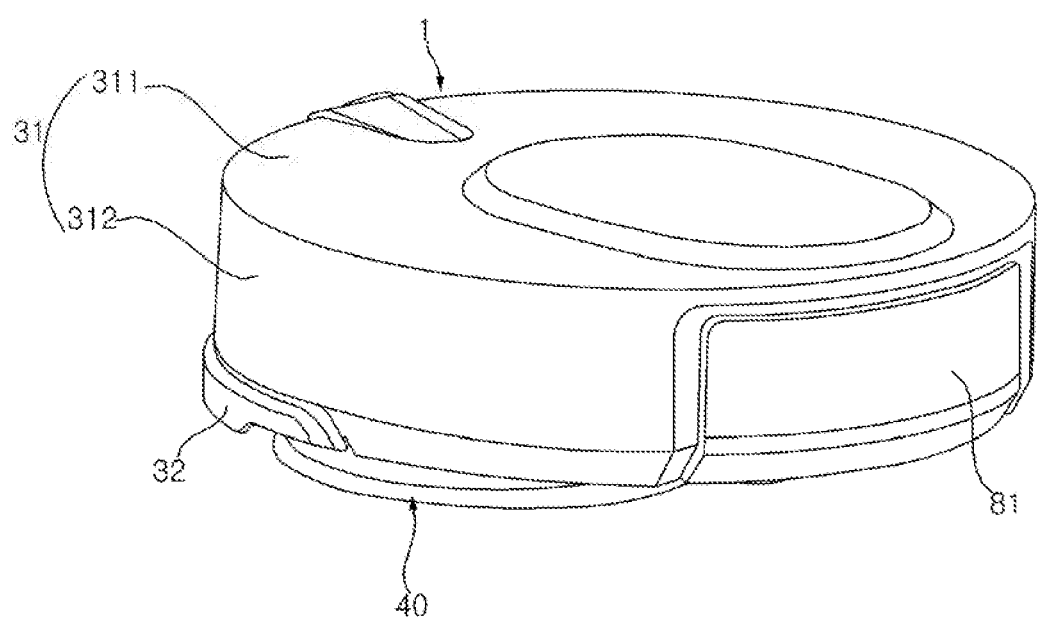
FIG. 1 is a perspective view of a mobile robot according to an embodiment of the present disclosure.

Advantages and features of the present disclosure and methods for accomplishing the same will be more clearly understood from exemplary embodiments described below with reference to the accompanying drawings. However, the present disclosure is not limited to the following embodiments, but may be implemented in various different forms. The embodiments are provided only to complete disclosure of the present disclosure and to fully provide a person having ordinary skill in the art, to which the present disclosure pertains, with the category of the present disclosure, and the present disclosure will be defined by the scope of the appended claims. Wherever possible, like reference numerals generally denote like elements through the specification.

In the following description, the terms indicating directions, such as "front (F)," "rear (R)," "left (Le)," "right (RI)," "up (U)," "down (D)," and the like, are defined based on a traveling direction of the mobile robot. These terms, however, are used merely to provide a better understanding of the present disclosure, and it is apparent that the directions can be defined differently by difference references.

The terms, "first," "second," "third," etc., used in this disclosure, do not necessarily denote any order, importance, or hierarchy, but rather the terms are used to merely distinguish one element from another. For example, only a second element may be included without a first element.

The term "mop" used herein may be made of various materials, such as fabric or paper, and may be intended for repetitive use by washing or for one-time use.

The present disclosure may be applied to a mobile robot which may be manually moved by a user, a robot cleaner which may autonomously move, and the like. The following description will be given using a mobile robot as an example.

A mobile robot 1 according to an embodiment of the present disclosure has a body 20 including a controller. The mobile robot 1 includes a mop module 40 configured to mop a floor while being in contact with the floor (surface to be cleaned). The mobile robot 1 includes a sweep module configured to collect foreign materials on the floor.

The mop module 40 is disposed below the body 20 and supports the body 20. The sweep module 20 is disposed below the body 20 and supports the body 20. In the embodiment, the body 20 is supported by the mop module 40 and the sweep module. The body 20 forms an exterior of the mobile robot 1. The body 20 is disposed to connect the mop module 40 and the sweep module.

The mop module 40 may form an exterior. The mop module 40 is disposed below the body 20 and at the rear of the sweep module. The mop module 40 provides a driving force for movement of the mobile robot 1. In order to move the mobile robot 1, the mop module 40 is desirably disposed at the rear of the mobile robot 1.

The mop module 40 includes at least one floor cloth 411 which wipes the floor while rotating. The mop module 40 includes at least one spin mop 41, which when viewed from the top, rotates clockwise or counter-clockwise. The spin mop 41 is in contact with the floor.

In the embodiment, the mop module 40 includes a pair of spin mops 41a and 41b. The pair of spin mops 41a and 41b rotate clockwise or counter-clockwise when viewed from above, and mops the floor during the rotation. Of the pair of the spin mops 41a and 41b, a spin mop, which is located at the left side when viewed from the front in a traveling direction of the mobile robot 1, is defined as a left spin mop 41a, and a spin mop located at the right side is defined as a right spin mop 41b.

Each of the left spin mop 41a and the right spin mop 41b rotates about a rotation axis. The rotation axis is disposed vertically. The left spin mop 41a and the right spin mop 41b may rotate independently of each other.

Each of the left spin mop 41a and the right spin mop 41b includes the floor cloth 411, a rotary plate 412, and a spin shaft 414. Each of the left spin mop 41a and the right spin mop 41b includes a water accommodating part 413.

The sweep module may form an exterior. The sweep module is disposed at the front of the mop module 40. In order to prevent the mop module 40 from first coming into contact with foreign materials on the floor, the sweep module is desirably disposed at the front in a traveling direction of the mobile robot 1.

The sweep module is spaced apart from the mop module 40. The sweep module is disposed at the front of the mop module 40 and is in contact with the floor. The sweep module collects foreign materials from the floor.

While being in contact with the floor, the sweep module collects foreign materials, located in front of the sweep module, into the inside while the mobile robot 1 moves. The sweep module is disposed below the body 20. The sweep module has a width from side to side which is smaller than a width from side to side of the mop module 40.

The bumper 30 may surround at least a portion of an outer circumference of the body 20, may surround the entire outer circumference of the body 20, or may surround a top portion of the body 20. The bumper 30 includes a case 31, which forms an exterior of the mobile robot 1, and a base 32 which is disposed below the case 31.

The case 31 forms a lateral surface and a top surface of the bumper 30. The base 32 forms a bottom surface of the bumper 30.

In the embodiment, the case 31 has a cylindrical shape with an open bottom surface. When viewed from above, the overall shape of the case 31 is a circle. As a plane of the case 31 has a circular shape, a radius of gyration during rotation may be minimized.

The case 31 includes: a top wall 311 having a circular shape; and a side wall 312 which is integrally formed with the top wall 311 and extends downward from the edge of the top wall 311.

The side wall 312 is partially open. An open portion of the side wall 312 is defined as a water tank insertion hole 313, through which a water tank 81 is detachably installed. The water tank insertion hole 313 is formed at the rear in a traveling direction of the mobile robot 1. As the water tank 81 is inserted through the water tank insertion hole 313, the water tank insertion hole 313 is desirably disposed adjacent to the mop module 40.

The mop module 40 is connected to the base 32, and the sweep module 80 is connected to the base 32. A controller Co and a battery Bt are provided in an internal space formed by the case 31 and the base 32. Further, a mop driving part is disposed in the body 20. The water supply module 80 is disposed at the body 20.

The base 32 includes: a base body 321 which covers the open bottom surface of the case 31; a base guard 322 which is formed along an outer edge of the base body 321 and protrudes downward from the edge of the base body 321; and an insertion hole 323 which is vertically formed through the base body 321, and into which the sweep module 2000 is detachably inserted.

Hereinafter, a bumper guide structure will be described with reference to FIGS. 1 to 8.

The bumper guide structure includes: a position restoring module 60 which provides a restoring force toward a position before impact when the impact is applied to the mobile robot; a bumper guide module 50 which guides the mobile robot to the position before impact while the position is restored; and an impact sensing module 70 which senses the impact applied to the mobile robot.

The bumper guide module 50 will be described below with reference to FIGS. 2 to 5.

The bumper guide module 50 is a device which allows the bumper 30 to move within a predetermined range when an impact is applied, and which guides the bumper 30 to a position before impact when the bumper 30 moves.

The bumper guide module 50 has a guide hole 51 formed at the bumper 30 or the body 20, and a protruding guider 53 which is inserted into the guide hole and moves inside the guide hole.

The shape of the guide hole 511 will be described below with reference to FIGS. 2 and 5.

The guide hole 51 is formed at the bumper 30 or the body 20. As illustrated in FIGS. 2 and 5, the guide hole 51 may be formed through the bumper 30, and may be formed at the body 20 within a range which may be easily modified by those skilled in the art.

Figure 2:
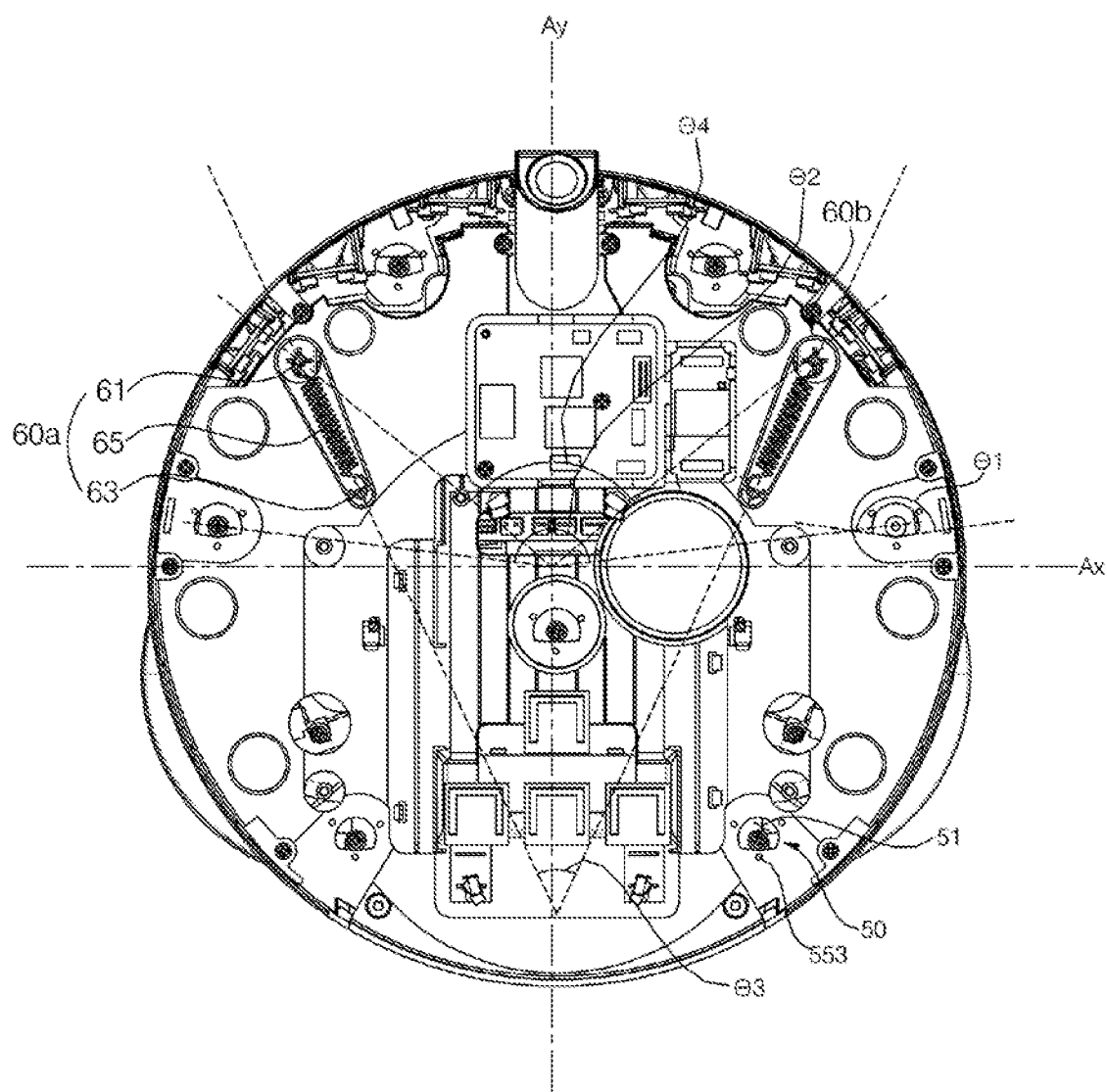
FIG. 2 is a plan view of an interior of a mobile robot excluding a bumper according to an embodiment of the present disclosure.
Figure 5:
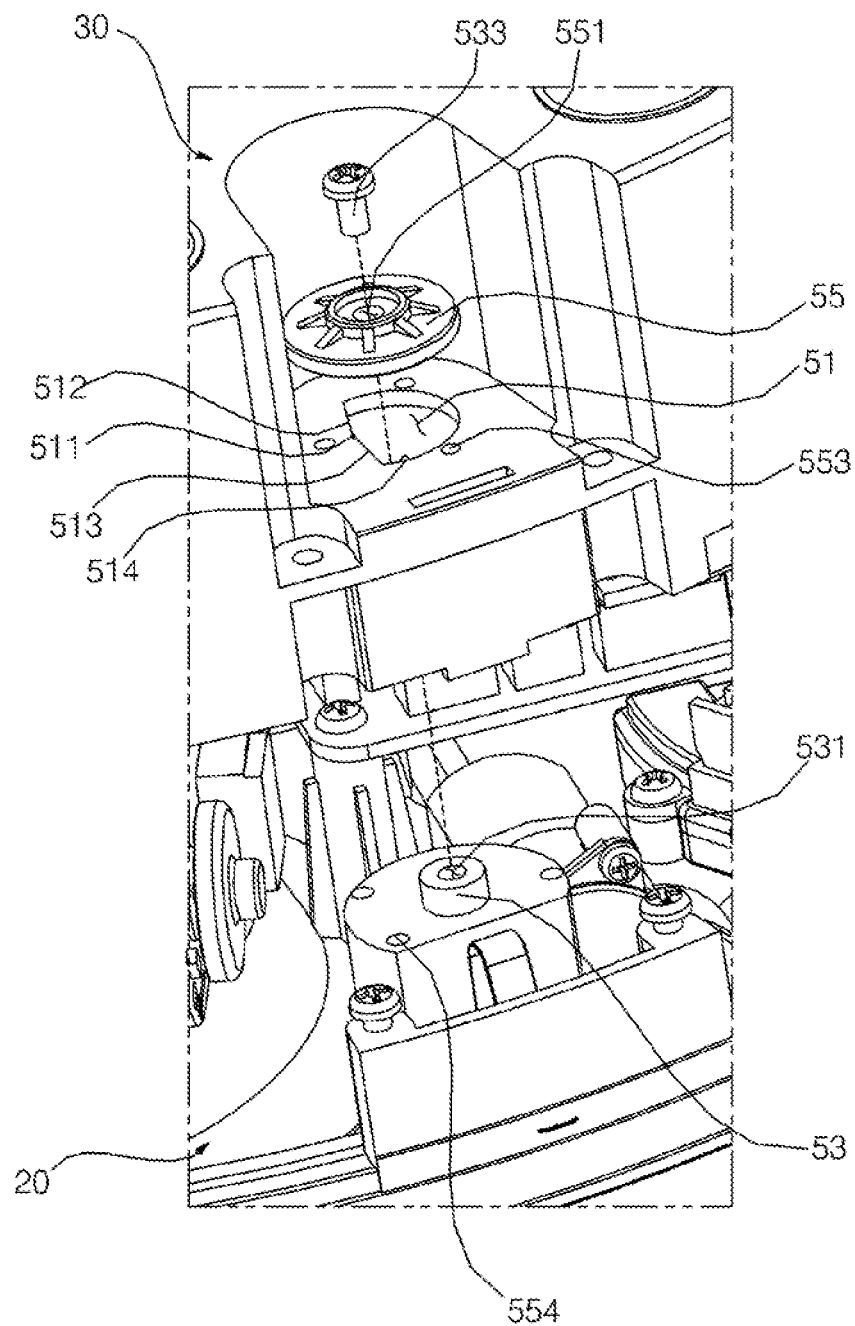
FIG. 5 is an exploded perspective view of a bumper guide module according to an embodiment of the present disclosure.

The guide hole 51 may be horizontal to the ground as illustrated in FIGS. 2 and 5.

The guide hole 51 has an origin point 511, at which the protruding guider is located when no impact is applied. When the protruding guider is positioned at the origin point 511, there is a space in the bumper 30 which is separated from the body 20. The protruding guider 53 may have a predetermined width from its central point, and thus, the central point of the protruding guider 53 may not coincide with the origin point 511 of the guide hole 51.

A first part 512 extends leftward from the origin point 511 of the guide hole 51. The first part 512 may extend linearly. The first part 512 may have a shape which is convex rearward or a shape which is convex forward.

A second part 513 extends rightward from the origin point 511 of the guide hole. The second part 513 may be symmetrical to the first part 512. The second part 513 may extend linearly. The second part 513 may have a shape which is convex rearward or a shape which is convex forward.

A third part 514 connects a left end of the first part 512 and a right end of the second part 513. As illustrated in FIGS. 2 and 5, the first part 512 may extend forward or rearward (not shown).

The first part 512, the second part 513 and the third part 514 are connected with each other to form a closed loop. The first part 512, the second part 513 and the third part 514 are connected with each other to form a closed space.

According to a first embodiment of the present disclosure, the first part 512 may extend to the front left side from the origin point 511, and the second part 513 may extend to the front right side from the origin point 511. The first part 512 and the second part 513 may be symmetrical to each other. The first part 512 and the second part 513 may be linearly formed, or may have a curved surface.

An angle θ1, formed between the first part 512 and the second part 513 with respect to the origin point 511, may be an obtuse angle. When viewed from the front of the mobile robot, the angle θ1, formed between the first part 512 and the second part 513, may be within a range of 90 degrees to 180 degrees.

According to a second embodiment of the present disclosure, the origin point 511 may be located behind the left end of the first part 512 or the right end of the second part 513.

When viewed from above, the origin point 511 may be located at a rearmost position in a cross-section of the guide hole 51. Accordingly, when impact is applied to a front side or to a lateral side, the bumper 30 may move to a rear side or to a lateral side. When an external force is applied on a lateral side, the bumper 30 may move to an opposite lateral side, and more particularly to a rear lateral side, without moving to the front lateral side.

While in operation, the mobile robot moves forward or rotates, such that there is no need to consider the impact on the rear side. Accordingly, by having the origin point 511 at the rearmost position, it is possible to prevent the bumper 30 from moving to the front side meaninglessly, thereby preventing vibrations and increasing stability.

The third part 514 may extend forward from the left end of the first part 512 or the right end of the second part 513, and may have a curved surface which is convex forward. The protruding guider may move inside the third part 514, and the bumper 30 may perform a curved movement while moving rearward. While the mobile robot rotates when colliding with an obstacle on the lateral side, the bumper 30 may perform a curved movement during the rearward movement, thereby allowing the mobile robot to smoothly rotate.

According to a third embodiment, the first part 512 may extend from the origin point 511 to the front left side in a radial direction, the second part 513 may extend from the origin point 511 to the front right side in a radial direction, and the third part 514 may extend forward from the left end of the first part 512 to the right end of the second part 513 to form a curved surface which is convex forward. The first part 512, the second part 513 and the third part 514 may have a fan shape. A curved surface of the fan shape faces forward, and a central portion thereof faces rearward.

The shape of the protruding guider 53 will be described with reference to FIGS. 5 and 6.

The protruding guider 53 is formed at the bumper 30 or the body 20. The protruding guider 53 is formed at a position corresponding to the guide hole 51. The guide hole 51 may protrude from the body 20 as illustrated in FIGS. 5 and 6. The protruding guider 53 may protrude from the top of a protruding surface, which protrudes upward from the body 20.

The protruding guider 53 has a lateral surface which is adjacent to the inner surface of the guide hole 51.

A separation prevention cap 55 is a device for preventing the protruding guider 53, which moves while being inserted into the guide hole 51, from being separated therefrom. The separation prevention cap 55 is connected to the top of the protruding guider 53.

Figure 6A:
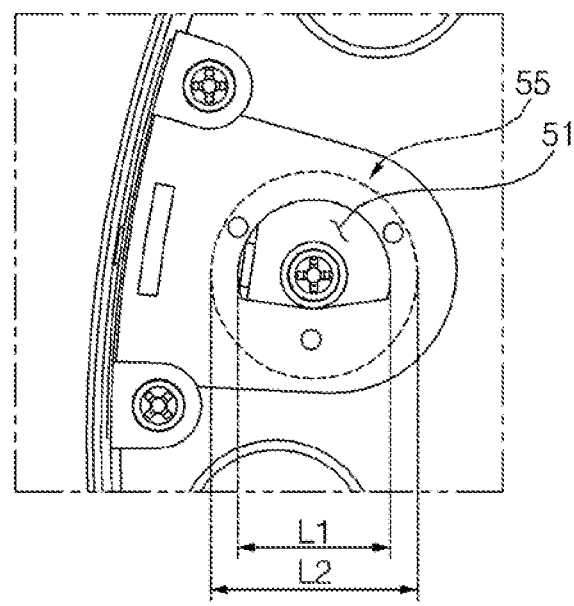
FIG. 6A is a plan view of a bumper guide module according to an embodiment of the present disclosure.

Referring to FIG. 6A, a width L1 of one side of the separation prevention cap 55 is not smaller than a width L2 of the guide hole 51 formed at a position which vertically corresponds to the width L1 of the separation prevention cap 55. The separation prevention cap 55 may have a disk shape, and a diameter corresponding to the width L1 of the separation prevention cap 55 may not be smaller than the width L2 of the guide hole 51, thereby producing an effect in that the connection of the protruding guider 53 and the guide hole 51 may not be separated.

Referring to FIG. 5, the top of the bumper 30 is adjacent to the separation prevention cap 55, and the bottom thereof is adjacent to the top surface of the body 20.

The protruding guider 53 includes: a female screw 531 formed at the center thereof; a hole 551 which is vertically formed through the center of the separation prevention cap 55; and a male screw 533 which is screwed into the female screw 531 through the hole 551. Accordingly, the separation prevention cap 55 may freely rotate about the male screw 533 as a rotation axis, and friction with the bumper 30 may be minimized by the free rotation of the separation prevention cap 55.

Referring to FIG. 5, the protruding guider 53 includes a protrusion 553 which protrudes upward from the bumper 30. The protrusion 553 may be formed in a region which vertically overlaps the separation prevention cap 55. The protrusion 553 may be adjacent to the lower end of the separation prevention cap 55. The protrusion 553 may be disposed on a circumference of the guide hole 51. There may be a plurality of protrusions 553. The protrusion 553 has the effect of reducing friction by minimizing a contact area between the lower end of the separation prevention cap 55 and the upper end of the bumper 30.

According to an embodiment of the present disclosure, the body 20 includes a protrusion 554 which protrudes upward from the body 20. The protrusion 554 may be disposed in a region which vertically overlaps the bumper 30. The protrusion 554 may be adjacent to the lower end of the bumper 30. There may be a plurality of protrusions 554. The protrusion 554 has the effect of reducing friction by minimizing a contact area between the lower end of the bumper 30 and the upper end of the body 20.

The mobile robot may include two or more bumper guide modules 50. The mobile robot may include two or more bumper guide modules 50 which are symmetrical to each other with respect to a vertical central axis. By having the bumper guide modules 50 which are disposed symmetrical to each other, even when one of the bumper guide modules 50 breaks down, the other may guide the bumper 30.

The mobile robot may include a bumper guide module 50*a* which is disposed at the vertical central axis Ay. The mobile robot may further include a position detection sensor in the bumper guide module 50 disposed at the vertical central axis Ay.

An angle θ2, formed by a left bumper guide module 50*f*, a point of intersection between the vertical central axis Ay and a horizontal central axis Ax, and a right bumper guide module 50*c*, may be equal to the angle θ1 formed between the first part 512 and the second part 513.

The position restoring module 60 will be described below with reference to FIG. 2. When the bumper 30 is moved by impact, the position restoring module 60 provides a restoring force so that the position of the bumper 30 may be restored to a position before impact. The position restoring module 60 has one side which is connected to the body 20 and the other side which is connected to the bumper 30, and includes an elastic member 65.

The position restoring module 60 may further include: a first protruding member 61 which protrudes upward from one side of the body 20; and a second protruding member 63 which protrudes from one side of the bumper 30 and is disposed behind the first protruding member 61. The elastic member 65 may connect the first protruding member 61 and the second protruding member 63.

The first protruding member 61 may be disposed at 45 degrees to the front from a central point where the vertical central axis Ax and the horizontal central axis Ax intersect.

Figure 7:
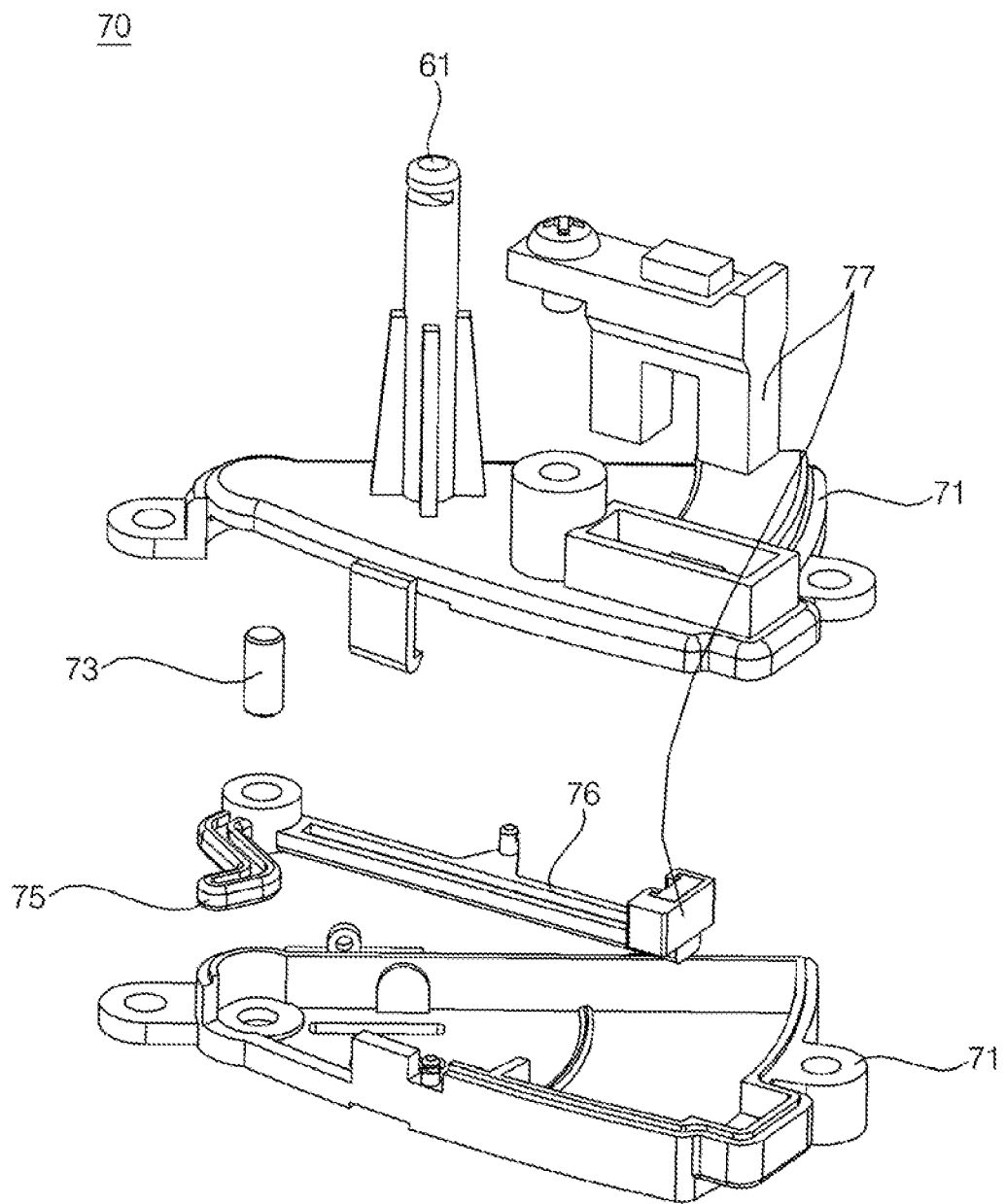
FIG. 7 is an exploded perspective view of a sensing module according to an embodiment of the present disclosure.

Referring to FIGS. 2 and 7, the first protruding member 61 may protrude from the top of a sensing module case 71. The first protruding member 61 may be vertical to a hinge 73 of a sensing module.

The position restoring module 60 may further include a left position restoring module 60*a* and a right position restoring module 60*b*, and the left position restoring module 60*a* and the right position restoring module 60*b* may be symmetrical to each other with respect to the vertical central axis Ay.

Figure 3:
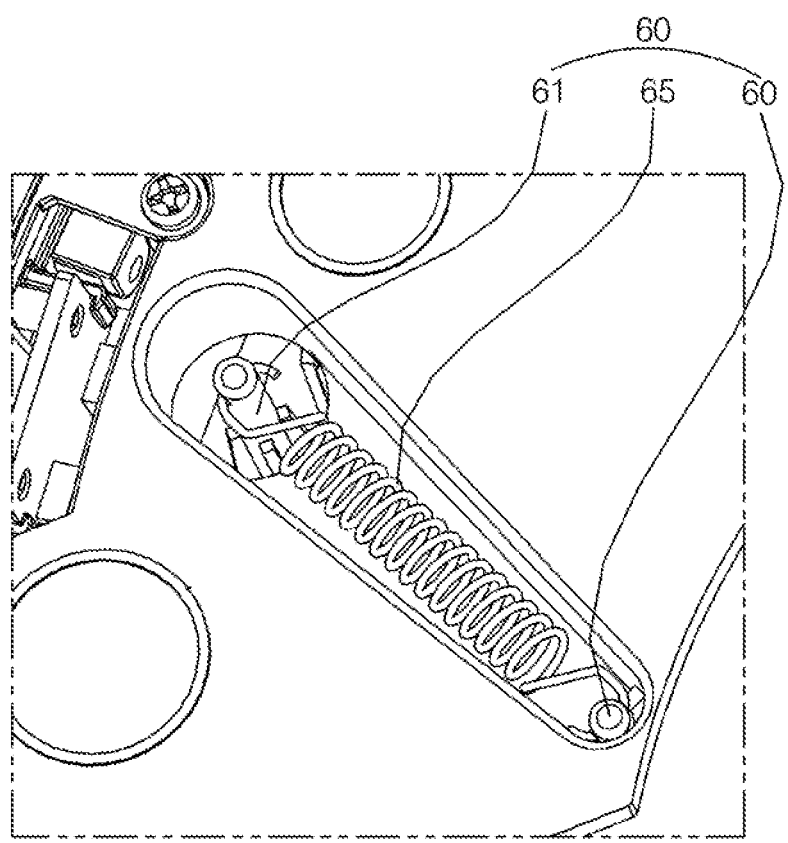
FIG. 3 is a perspective view illustrating an assembly structure of a position restoring module according to an embodiment of the present disclosure.
Figure 4:
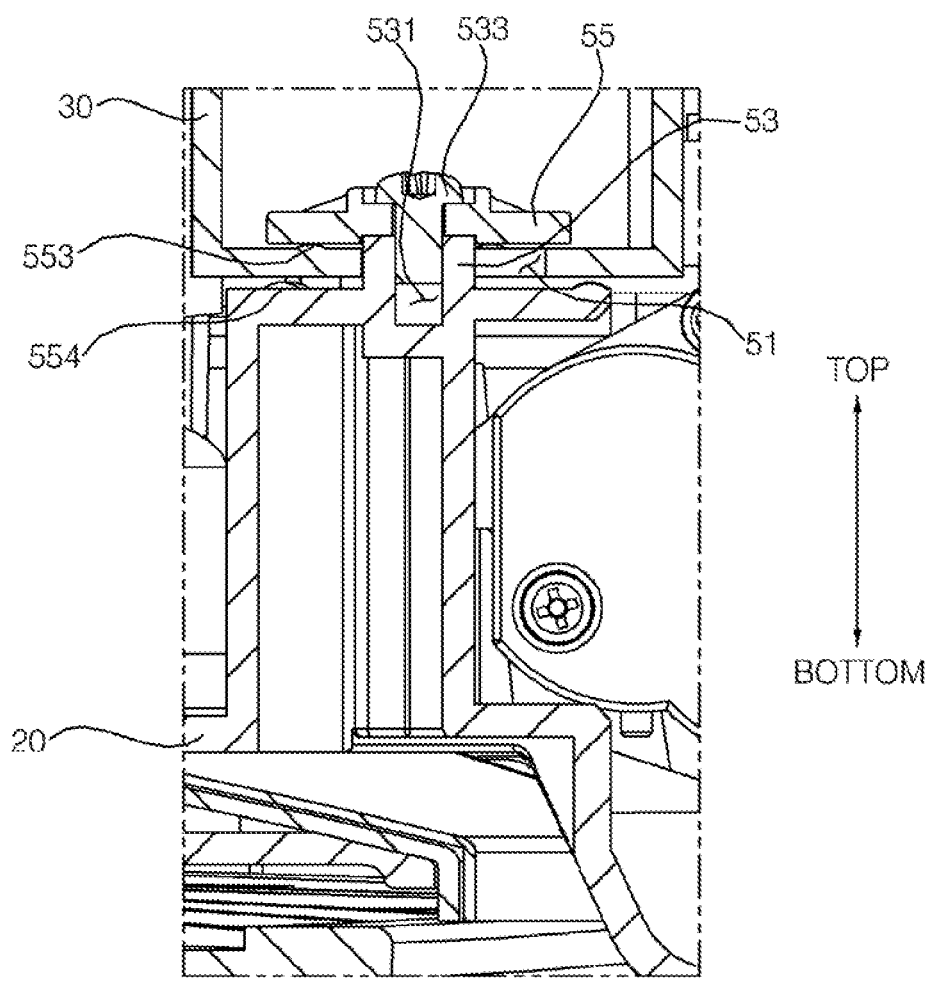
FIG. 4 is an assembled cross-sectional perspective view of a bumper guide module according to an embodiment of the present disclosure.

Referring to FIG. 3, the left position restoring module 60*a* and the right position restoring module 60*b* may be disposed diagonally. The left position restoring module 60*a* and the right position restoring module 60*b* may be disposed in a radial direction. An angle θ3, formed between the left position restoring module 60*a* and the right position restoring module 60*b*, may be an acute angle when viewed from the front. Accordingly, the left position restoring module 60*a* is tensioned most when impact is applied on the left side, and the right position restoring module 60b is tensioned most when impact is applied on the right side.

While in operation, the mobile robot mostly moves forward, such that impulse at a front side is greater than impulse at a lateral side. Accordingly, as the position restoring module 60 is disposed diagonally, a greater restoring force may be provided for an impact on the front side compared to an impact on the lateral side.

Referring to FIG. 2, the angle θ3, formed between the left position restoring module 60a and the right position restoring module 60b, may be smaller than the angle θ1 formed between the first part 512 and the second part 513. An angle, formed by a longitudinal extension line of a left elastic member 65a and a longitudinal extension line of a right elastic member 65b, may be smaller than the angle 61 formed between the first part 512 and the second part 513. When restored after collision, the protruding guider 53 may move toward the origin point 511 after coming into contact with the first part 512 or the second part 513, thereby minimizing vibrations and stably reaching the origin point 511.

An impact sensing module 70 will be described below with reference to FIG. 7.

The impact sensing module 70 is a device for determining whether there is impact by sensing the movement of the bumper 30 when the position of the bumper 30 is moved by an external force or impact. The impact sensing module 70 is disposed at one side of the body 20, and includes a bar which is adjacent to the bumper 30 and moves along with the bumper 30 when impact is applied.

The impact sensing module 70 may include: a sensing module case 71 disposed at one side of the body 20; and a hinge 73 disposed inside the sensing module case 71 and having a rotation axis which is perpendicular to the floor. The impact sensing module 70 may include bars, including: a first bar 75, one side of which is adjacent to an inner surface of the bumper 30 and the other side of which is connected to the hinge 73; and a second bar 76, on one side of which a detection sensor 77 is disposed, and the other side of which is connected to the hinge 73.

The first bar 75 and the second bar 76 may form an acute angle with respect to the hinge 73.

The first bar 75 extends in a radial direction from the hinge 73, to be curved toward the bumper 30.

The detection sensor 77 is a sensor for detecting the movement of the second bar 76, and checks whether there is impact by sensing the movement of the bumper 30 which is adjacent to the second bar 76. The detection sensor 77 includes a photo interrupter. The detection sensor 77 may include: a first sensor which penetrates from above into the sensing module case 71 to be connected thereto; and a second sensor which is connected to the second bar 76. Based on a radial direction, the first sensor is disposed to surround three surfaces, i.e., an inner surface, an outer surface and a top surface, of the second sensor. In the case where the second sensor rotates about the hinge 73, the first sensor may sense the change and transmit data to the controller.

Referring to FIG. 2, there may be a plurality of impact sensing modules 70, including a left impact sensing module 70a, which is disposed on the front left side, and a right impact sensing module 70b, which is disposed on the front right side. With respect to a point of intersection between the vertical central axis Ay and the horizontal central axis Ax, an angle θ3 formed between the left impact sensing module 70a and the right impact sensing module 70b may be smaller than the angle θ1 formed between the first part 512 and the second part 513. With respect to a point of intersection between the vertical central axis Ay and the horizontal central axis Ax, an angle θ4 formed between the left impact sensing module 70a and the right impact sensing module 70b may be 90 degrees.

An operation of the mobile robot according to the present disclosure, which is configured as described above, will be described below.

Figure 6B:
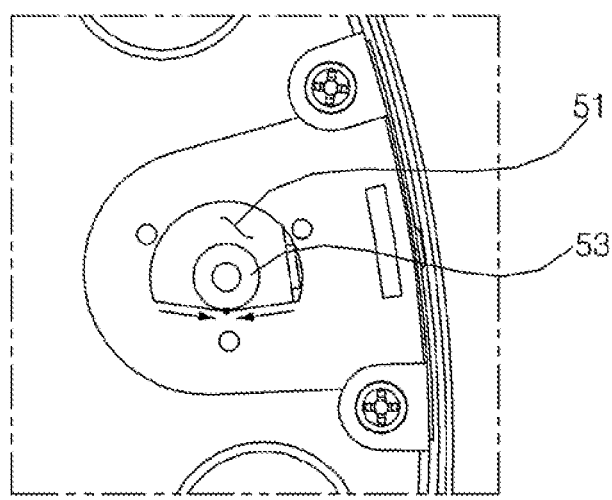
FIG. 6B is a plan view of a bumper guide module in the case where there is no external force according to an embodiment of the present disclosure.
Figure 6C:
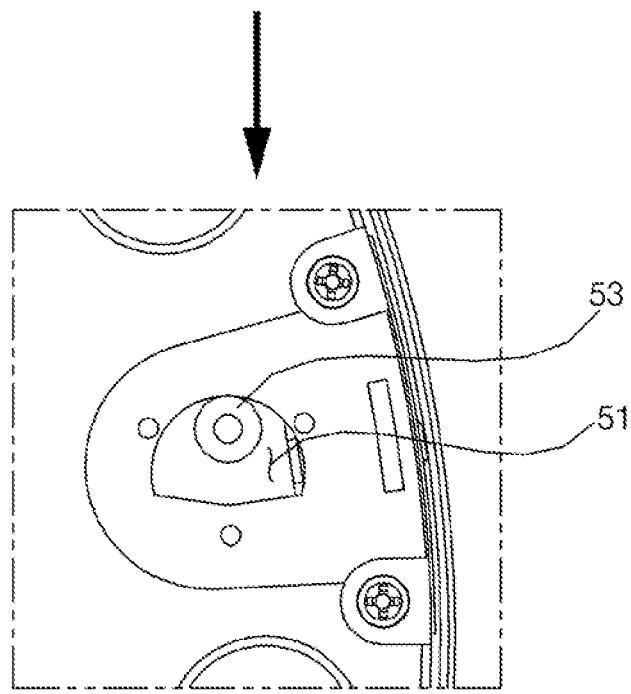
FIG. 6C is a plan view of a bumper guide module in the case where an external force is applied on the front side according to an embodiment of the present disclosure.
Figure 6D:
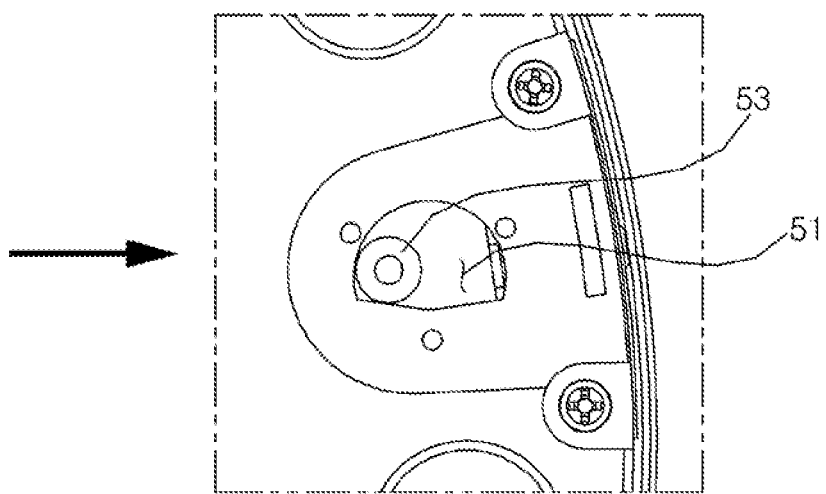
FIG. 6D is a plan view of a bumper guide module in the case where an external force is applied on the left side according to an embodiment of the present disclosure.
Figure 6E:
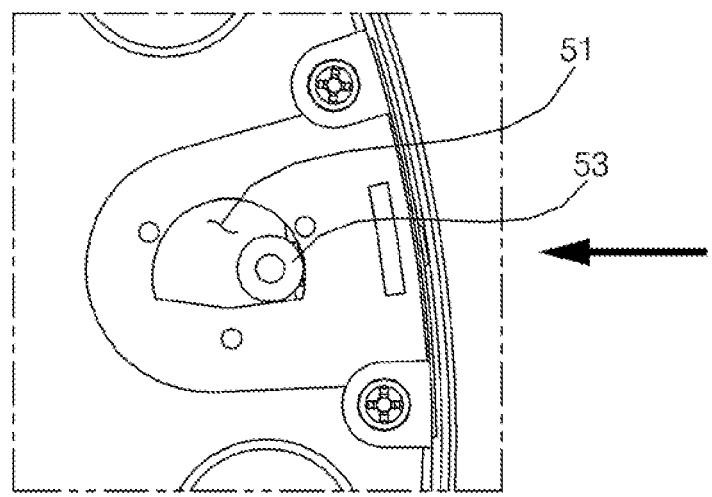
FIG. 6E is a plan view of a bumper guide module in the case where an external force is applied on the right side according to an embodiment of the present disclosure.

Referring to a use state view, when the mobile robot collides with an obstacle head-on, the protruding guider 53 is positioned at the front of the guide hole 51 as illustrated in FIG. 6B. In the case where a left side of the mobile robot collides with an obstacle, the protruding guider 53 is positioned at the left side of the guide hole 51. In the case where a right side of the mobile robot collides with an obstacle, the protruding guider 53 is positioned at the right side of the guide hole 51.

Figure 8A:
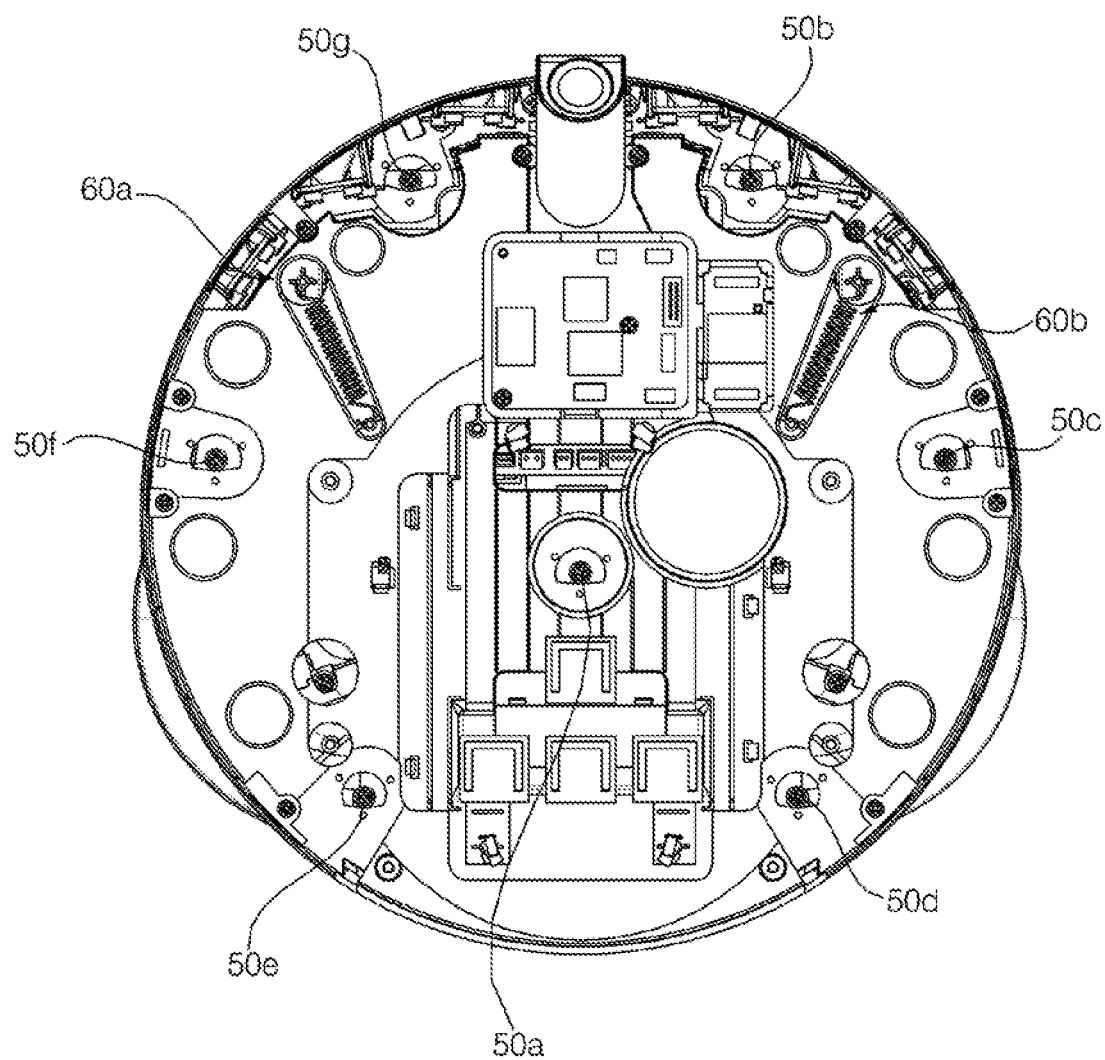
FIG. 8A is a plan view of a mobile robot in the case where there is no external force according to an embodiment of the present disclosure.
Figure 8B:
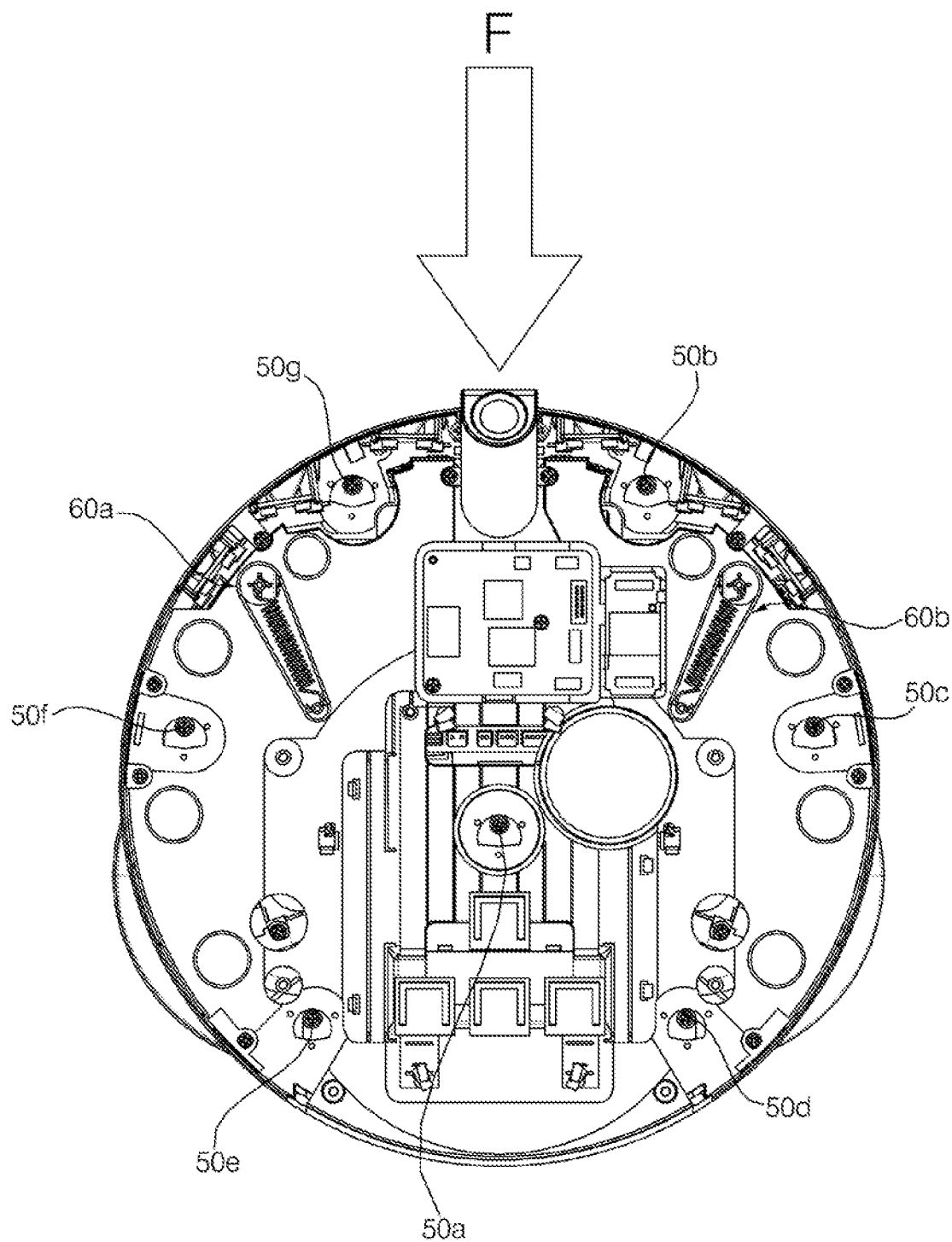
FIG. 8B is a plan view of a mobile robot in the case where an external force is applied on the front side according to an embodiment of the present disclosure.

FIG. 8b illustrates a case where the mobile robot collides with an obstacle head-on. In this case, the bumper 30 moves to the rear side of the body 20. In all the bumper guide modules 50, the protruding guider 53 moves to the front side of the guide hole 51. In the position restoring module 60, all the elastic members 65 are tensioned, and a resultant of restoring forces of the left elastic member 65a and the right elastic member 65b is ON at the left/right sides, and is present only at the front. In the impact sensing module 70, the left/right sensing modules sense the movement.

Figure 8C:
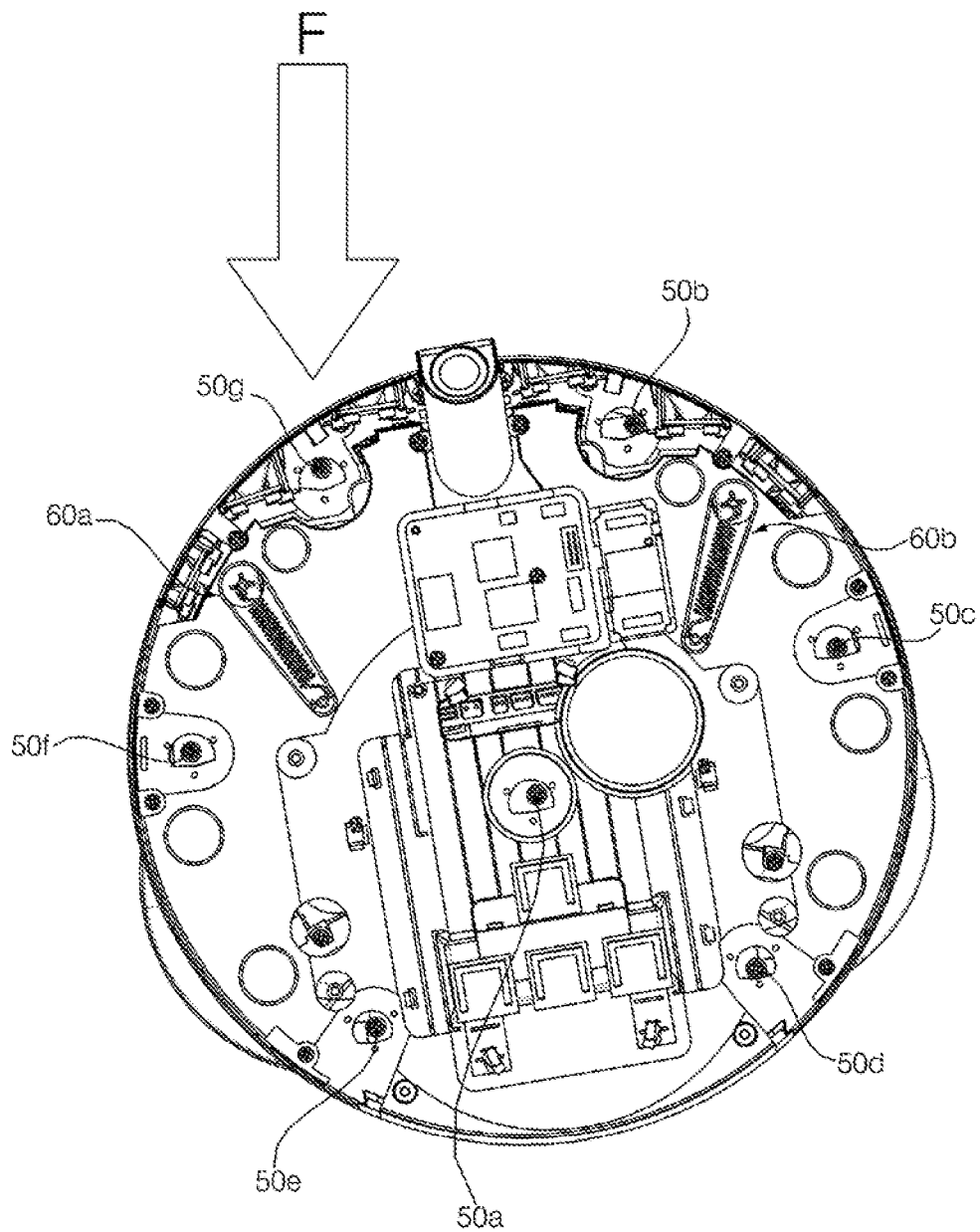
FIG. 8C is a plan view of a mobile robot in the case where an external force is applied on the front left side according to an embodiment of the present disclosure.

FIG. 8C illustrates a case where a left side of the mobile robot, which moves forward, collides with an obstacle. A moment is generated counterclockwise (CCW) in the mobile robot, and the bumper 30 turns to the left and moves rearward. In the bumper guide module 50, the protruding guider 53 of the front left bumper guide module 50g moves the most to the front side, and the protruding guider 53 of the rear right bumper guide module 50d does not move. In the position restoring module 60, the left elastic member 65a is tensioned most, and the right elastic member 65d is not tensioned or is least tensioned. When impact is applied on the front side, two elastic members 65 are tensioned, but when impact is applied on the lateral side, only one elastic member 65 is tensioned, such that a restoring force for the impact on the lateral side is reduced compared to the impact on the front side. In the impact sensing module 70, the left sensing module senses the movement, but the right sensing module does not sense the movement.

Figure 8D:
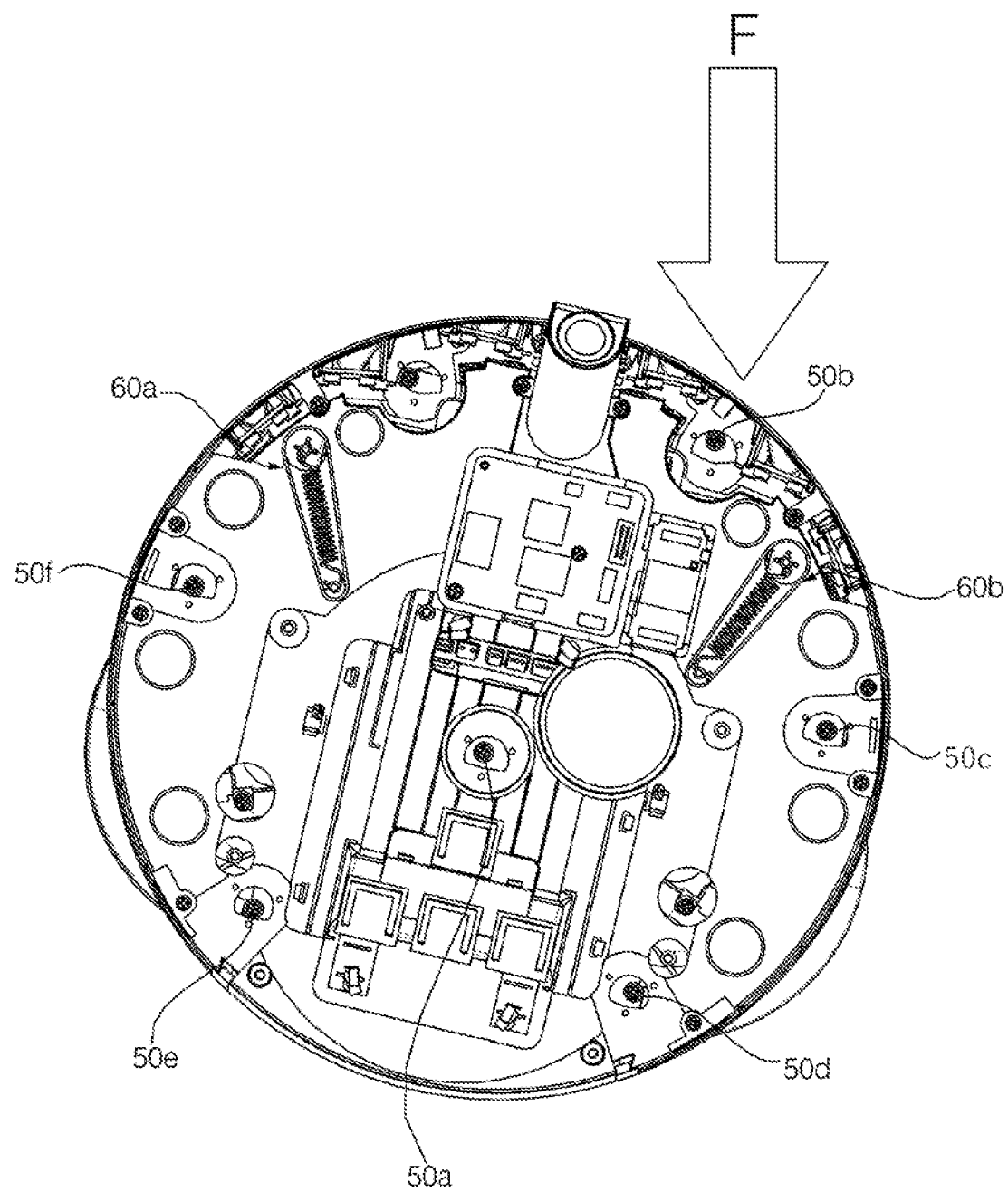
FIG. 8D is a plan view of a bumper guide module in the case where an external force is applied on the front right side according to an embodiment of the present disclosure.

FIG. 8D illustrates a case where a right side of the mobile robot, which moves forward, collides with an obstacle. A moment is generated clockwise (CW) in the mobile robot, and the bumper 30 turns to the right, which is an opposite side to the case of FIG. 8C, such that a description thereof will be omitted.

According to the present disclosure, the mobile robot has one or more of the following effects.

Firstly, as the origin point of the guide hole is located behind the first part or the second part, the bumper may freely move within a predetermined range when an external force is applied, and may return to the origin point.

Secondly, the position restoring module is disposed diagonally, such that the same restoring force may be provided for different impulses of a side impact and a front impact.

Thirdly, by using two fan-shaped detection sensors, the front impact or the side impact may be detected, as well as a small external force.

While the present disclosure has been shown and described with reference to the preferred embodiments thereof, it should be understood that the present disclosure is not limited to the aforementioned specific embodiments, and various modifications and variations may be made by those skilled in the art without departing from the scope and spirit of the invention as defined by the appended claims, and the modified implementations should not be construed independently of the technical idea or prospect of the present disclosure.

What is claimed is:

1. A mobile robot, comprising:
a body;
a bumper disposed separately from the body and configured to surround at least a portion of an outer circumference of the body;
a position restoring module comprising a first side connected to the body, a second side connected to the bumper, and an elastic member;
a bumper guide module comprising a guide hole formed at a side of the bumper, and a protruding guider configured to be inserted into the guide hole and to move inside the guide hole;
a separation prevention cap configured to connect to a top of the protruding guider;
one or more protrusions protruding in an upward direction from the bumper, the protrusions being disposed in a region of the body vertically overlapping the separation prevention cap; and
an impact sensing module disposed on a side of the body, the impact sensing module comprising:
a bar disposed adjacent to the bumper and configured to move with the bumper, and
a detection sensor configured to detect movement of the bar,
wherein the guide hole comprises:
a first part extending leftward from an origin point of the protruding guider;
a second part extending rightward from the origin point and
a third part connecting a left end of the first part to a right end of the second part.

2. The mobile robot of claim 1, wherein the first part extends to a front left side of the guide hole, and the second part extends to a front right side of the guide hole.

3. The mobile robot of claim 2, wherein an angle formed between the first part and the second part is an obtuse angle.

4. The mobile robot of claim 1, wherein the origin point is located behind at least one of the left end of the first part and the right end of the second part.

5. The mobile robot of claim 1 wherein the third part extends forward from at least one of the left end of the first part and the right end of the second part, and wherein the third part has a curved surface facing a forward direction.

6. The mobile robot of claim 1, wherein at least one of the first part and the second part extends from the origin point in a radial direction, and the third part extends forward from at least one of the left side of the first part and the right side of the second part to form a curved surface facing a forward direction.

7. The mobile robot of claim 6, wherein the first part, the second part, and the third part form a fan shape.

8. The mobile robot of claim 1, wherein a width of a side of the separation prevention cap is greater than a width of the guide hole at a position aligned vertically with the width of the separation prevention cap.

9. The mobile robot of claim 1, wherein the protruding guider further comprises:

a female screw formed at a center of the protruding guider;
a hole formed through a center of the separation prevention cap; and
a male screw configured to interact with the female screw through the center of the separation prevention cap.

10. A mobile robot, comprising:
a body;
a bumper disposed separately from the body and configured to surround at least a portion of an outer circumference of the body;
a position restoring module comprising a first side connected to the body, a second side connected to the bumper, and an elastic member;
a bumper guide module comprising a guide hole formed at a side of the bumper, and a protruding guider configured to be inserted into the guide hole and to move inside the guide hole;
a separation prevention cap configured to connect to a top of the protruding guider;
one or more protrusions protruding in an upward direction from the body, the protrusions being disposed in a region of the body vertically overlapping the bumper; and
an impact sensing module disposed on a side of the body, the impact sensing module comprising:
a bar disposed adjacent to the bumper and configured to move with the bumper, and
a detection sensor configured to detect movement of the bar, wherein the guide hole comprises:
a first part extending leftward from an origin point of the protruding guider;
a second part extending rightward from the origin point and
a third part connecting a left end of the first part to a right end of the second part.

11. The mobile robot of claim 1, comprising two or more bumper guide modules disposed symmetrically to each other with respect to a vertical central axis of the body.

12. The mobile robot of claim 1, comprising two or more bumper guide modules disposed on an outer circumference of the body.

13. The mobile robot of claim 1 wherein:
the position restoring module further comprises a first protruding member protruding in an upward direction from a side of the body, and a second protruding member protruding from a side of the bumper and being disposed behind the first protruding member; and
the elastic member is configured to connect the first protruding member to the second protruding member.

14. The mobile robot of claim 1, wherein the position restoring module comprises a left position restoring module and a right position restoring module, and wherein the left position restoring module and the right position restoring module are symmetrical to each other with respect to a vertical central axis of the body.

15. The mobile robot of claim 14, wherein an angle formed at an intersection between longitudinal axes of the left position restoring module and the right position restoring module is smaller than an angle formed between the first part and the second part.

16. A mobile robot, comprising:
a body;
a bumper disposed separately from the body and configured to surround at least a portion of an outer circumference of the body;

a position restoring module comprising a first side connected to the body, a second side connected to the bumper, and an elastic member;
a bumper guide module comprising a guide hole formed at a side of the bumper, and a protruding guider configured to be inserted into the guide hole and to move inside the guide hole; and
an impact sensing module disposed on a side of the body, the impact sensing module comprising:
  a bar disposed adjacent to the bumper and configured to move with the bumper;
  a detection sensor configured to detect movement of the bar;
  a sensing module case disposed at a side of the body; and
  a hinge disposed inside the sensing module case and having a rotation axis perpendicular to the floor, wherein the bar comprises:
    a first bar comprising a first side disposed adjacent to an inner surface of the bumper, and a second side connected to the hinge; and
    a second bar having a detection sensor configured to detect movement disposed at a first side of the second bar, and comprising a second side connected to the hinge.

17. The mobile robot of claim 16, wherein the impact sensing module comprises a left impact sensing module disposed on a front left side of the impact sensing module, and a right impact sensing module disposed on a front right side of the impact sensing module.

* * * * *